(12) United States Patent
Pollitzer et al.

(10) Patent No.: US 9,302,723 B1
(45) Date of Patent: Apr. 5, 2016

(54) INTERCHANGEABLE POWER TRAIN SYSTEM FOR ELECTRIC POWERED VEHICLES

(71) Applicants: Erika Pollitzer, London (GB); Steve Bamdas, Lighthouse Point, FL (US)

(72) Inventors: Erika Pollitzer, London (GB); Steve Bamdas, Lighthouse Point, FL (US)

(73) Assignee: Resort Vehicles, Inc., West Palm Beach, FL (US)

( * ) Notice: Subject to any disclaimer, the term of this patent is extended or adjusted under 35 U.S.C. 154(b) by 0 days.

(21) Appl. No.: 14/626,159

(22) Filed: Feb. 19, 2015

(51) Int. Cl.
*B62D 63/04* (2006.01)
*B62D 63/02* (2006.01)
*B62D 61/06* (2006.01)
*B60K 17/04* (2006.01)
*B60K 1/04* (2006.01)
*B60K 1/00* (2006.01)
*B60T 1/00* (2006.01)

(52) U.S. Cl.
CPC .............. *B62D 63/025* (2013.01); *B60K 1/00* (2013.01); *B60K 1/04* (2013.01); *B60K 17/04* (2013.01); *B60T 1/00* (2013.01); *B62D 61/06* (2013.01)

(58) Field of Classification Search
CPC .................................................... B62D 63/025
See application file for complete search history.

(56) References Cited

U.S. PATENT DOCUMENTS

| | | |
|---|---|---|
| D188,718 S | 8/1960 | Laher |
| D228,751 S | 10/1973 | Kouri |
| D237,476 S | 11/1975 | Figura |
| 5,343,973 A | 9/1994 | Lanker |
| D381,293 S | 7/1997 | Cheng |
| 5,911,426 A | 6/1999 | Yamamoto et al. |
| D423,987 S | 5/2000 | Yaguchi et al. |
| 6,059,058 A * | 5/2000 | Dower ........................ 180/65.22 |
| D468,236 S | 1/2003 | Pollitzer et al. |
| 6,991,051 B2 | 1/2006 | Swindell et al. |
| 7,096,986 B2 | 8/2006 | Borroni-Bird et al. |
| 7,357,203 B2 | 4/2008 | Morrow et al. |
| 7,373,315 B2 * | 5/2008 | Chernoff et al. ............. 705/26.1 |
| 7,854,282 B2 | 12/2010 | Lee et al. |
| 2005/0052080 A1 | 3/2005 | Maslov et al. |
| 2009/0101422 A1 | 4/2009 | Subramanian |
| 2011/0079166 A1 | 4/2011 | Popa-Simil |
| 2011/0120787 A1 | 5/2011 | Lee et al. |
| 2012/0217080 A1 | 8/2012 | Besler et al. |

* cited by examiner

*Primary Examiner* — Jeffrey J Restifo
*Assistant Examiner* — Erez Gurari
(74) *Attorney, Agent, or Firm* — Malloy & Malloy, P.L.

(57) ABSTRACT

An interchangeable power train system for use with either a 3-wheel electric powered vehicle or a 4 wheel electric powered vehicle includes a power assembly and a drive assembly mounted to a support assembly and disposed in an operative communication with one another. A chassis assembly for a 3-wheel electric vehicle body and/or a 4 wheel electric vehicle body is provided, wherein the support assembly includes one or more mounts and the chassis assembly has one or more corresponding interconnects each dimensioned and disposed to temporarily yet securely interconnect to a corresponding one of the mounts on the support assembly. An interface assembly operatively connects the power assembly and the drive assembly to either a 3-wheel electric vehicle or a 4 wheel electric vehicle to permit operation by a user seated therein.

20 Claims, 7 Drawing Sheets

INTERCHANGEABLE POWER TRAIN SYSTEM FOR ELECTRIC POWERED VEHICLES

BACKGROUND OF THE INVENTION

1. Field of the Invention

The present invention is directed to a power train system for electric powered vehicles which is fully interchangeable between multiple body and chassis types, thereby eliminating the expense of design, tooling, and manufacture of power trains systems specific to a particular body/chassis type such as, by way of example only, a 3-wheel electric powered vehicle or a 4-wheel electric powered vehicle.

2. Description of the Related Art

A power train of a modern automobile consists of a power source, transmission, drive shaft, differentials, suspension, rear axle and rear wheels. In a gasoline engine vehicle, the power source is usually an internal combustion engine. In an electric vehicle, the power source is usually a battery, controller and electric motor.

There is a growing demand for easily assembled light 3-wheel and 4-wheel electric powered vehicles for use in resorts, inner cities, recreational areas, rural and gated communities and planned communities where the use of electric vehicles are encouraged. These vehicles can be privately owned, rented, leased, or pay-as-you-go where metered battery charging is available.

3-wheel and 4-wheel light electric powered vehicles are employed for a variety of purposes, to carry passengers and/or goods, and may be enclosed, open, or at least semi-open.

Today many small electric vehicles are delivered in a semi-knocked-down form, so that a variety of pre-packaged components can be obtained from any of a variety of different suppliers and custom assembled by the purchaser of the vehicle.

The purchaser may be an individual who orders the components for one particular configuration, or the purchaser may be a dealer or fleet owner who requires a variety of different optional components and, more importantly, requires the ability to assemble particular configurations from an inventory of interchangeable components.

When assembled, light electric powered vehicles are used for a variety of functions, as noted above, each with a different arrangement of seats, cargo space, front end and steering configurations. Examples include 3-wheel electric powered vehicles with handlebar steering where the passengers sit behind the driver, or the same 3-wheel vehicle with an extra rear-facing seat on the back, or with a cargo bed on the rear. Alternatively, 4-wheel electric powered vehicles include a steering wheel, steering column and rack & pinion steering, with or without doors, and with or without a cargo bed attached to the rear. Of course, both 3-wheel or 4-wheel electric powered vehicles have been configured for a variety of other special purposes.

As electric vehicles become more sophisticated, it would be beneficial to provide interchangeable energy sources, controllers, electric motors, transmissions, rear axles, rear wheels, rear brakes, etc. More in particular, it would be highly advantageous to have a common and interchangeable power train system comprising these components for use with the various body types and configurations so as to minimize the design, development and manufacture of individual power train system for specific vehicle configurations, and the cost associated therewith.

There is a need for easy and convenient vehicle assembly utilizing a common power train system. There is also a need for ease of interchange of common power train systems between different body and chassis configurations including, but not limited to, 3-wheel and 4-wheel electric powered vehicles. The interchange method needs to be quick, easy and convenient, through interlock and support systems. The interchange method should provide for vehicle load change on suspension, during the process of coupling and decoupling.

SUMMARY OF THE INVENTION

The present invention is directed to an interchangeable power train system for use with any of a plurality of different electric powered vehicles, including, by way of example only, 3-wheel electric powered vehicles and 4-wheel electric powered vehicles.

In at least one embodiment, an interchangeable power train system includes a power assembly and a drive assembly disposed in an operative communication with one another. A support assembly is provided onto which the power assembly and the drive assembly are mounted. A support assembly, in one embodiment, includes at least one mount, and in one further embodiment, a support assembly comprises a plurality of mounts, including suspension mounts and/or swing arm mounts. In yet one further embodiment, a support assembly comprises a pair of coil springs each mounted over a corresponding shock absorber, and a pair of swing arms extending forwardly thereof.

The chassis assembly for an electric powered vehicle includes a chassis structured and configured to support at least one of a plurality of different electric vehicle bodies. A chassis assembly, in one embodiment, includes at least one interconnect, and in one further embodiment, a chassis assembly comprises a plurality of interconnects, including suspension interconnects and/or swing arm interconnects. The suspension mounts and swing arm mounts of a support assembly and the suspension interconnects and swing arm interconnects of a chassis assembly are cooperatively structured and configured to facilitate quick, easy, and interchangeable interconnection between a support assembly of the present invention and a chassis assembly of any of a plurality of different electric powered vehicles.

In at least one embodiment, an interface assembly operatively connects the interchangeable power train system to each of a plurality of different electric vehicles, to permit operation of the same, one at a time.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION

Figure 4:
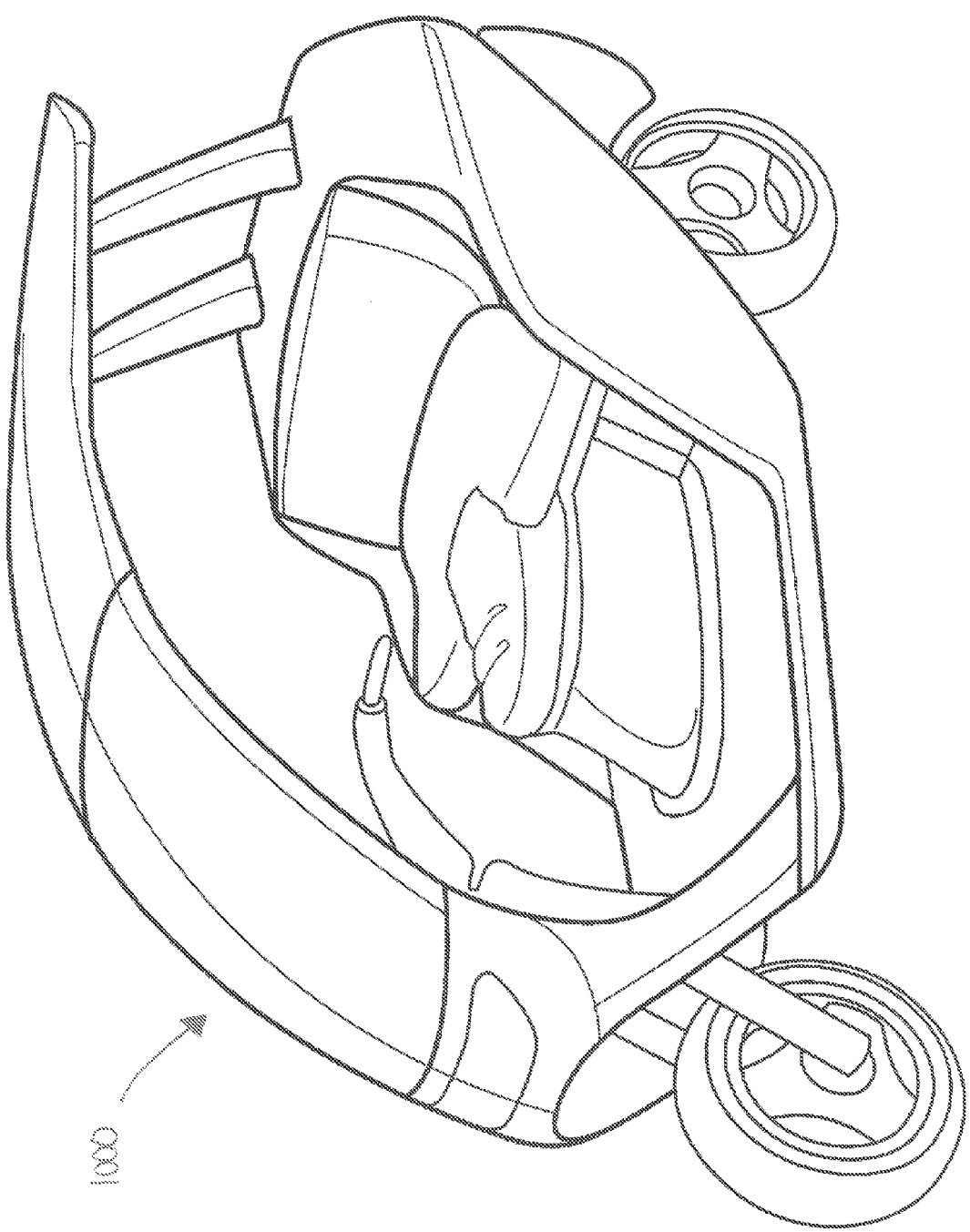
FIG. 4 is a perspective view of a 3-wheel electric powered vehicle comprising an interchangeable power train system in accordance with the present invention.
Figure 5:
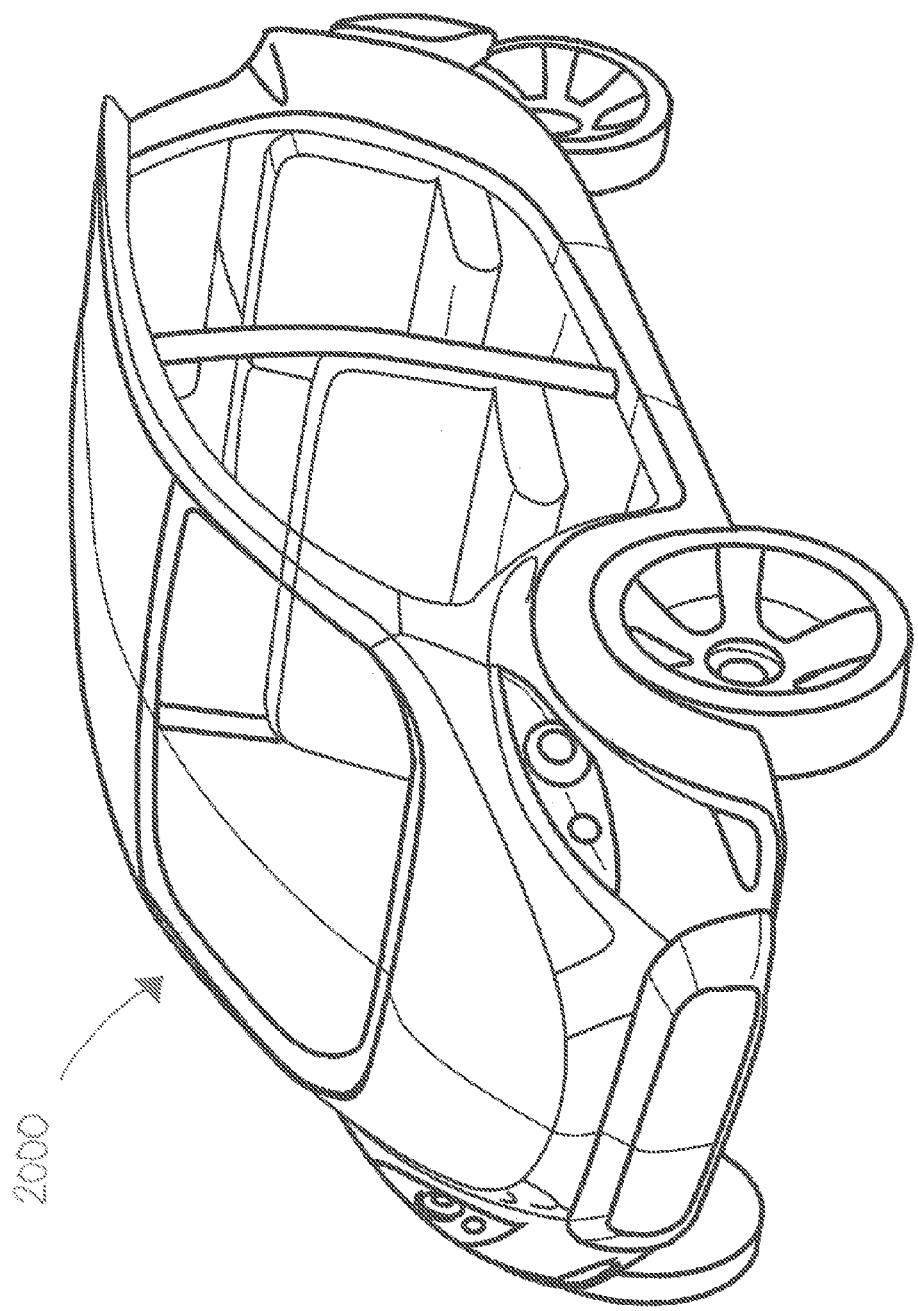
FIG. 5 is a perspective view of a 4-wheel electric powered vehicle comprising an interchangeable power train system in accordance with the present invention.

As previously indicated, the present invention is directed to an interchangeable power train system 10 for an electric powered vehicle as shown in the figures. More in particular, an interchangeable power train system 10 for an electric powered vehicle in accordance with the present invention is dimensioned and configured for interconnection to a plurality of different electric powered vehicles. As just one example, the system 10 of the present invention can be interconnected to a chassis and body of a 3-wheel electric powered vehicle such as is shown by way of example by way of example as 1000 in FIG. 4. As just one further example, an interchangeable power train system 10 for an electric powered vehicle of the present invention may be interconnected to a chassis and body of a 4-wheel electric powered vehicle such as is shown at 2000 in FIG. 5. It is noted that the 3-wheel and 4-wheel electric powered vehicles shown in FIGS. 4 and 5 are merely illustrative of two of the types of electric powered vehicles to which an interchangeable power train system 10 in accordance with the present invention may be interconnected and operable with.

Figure 1:
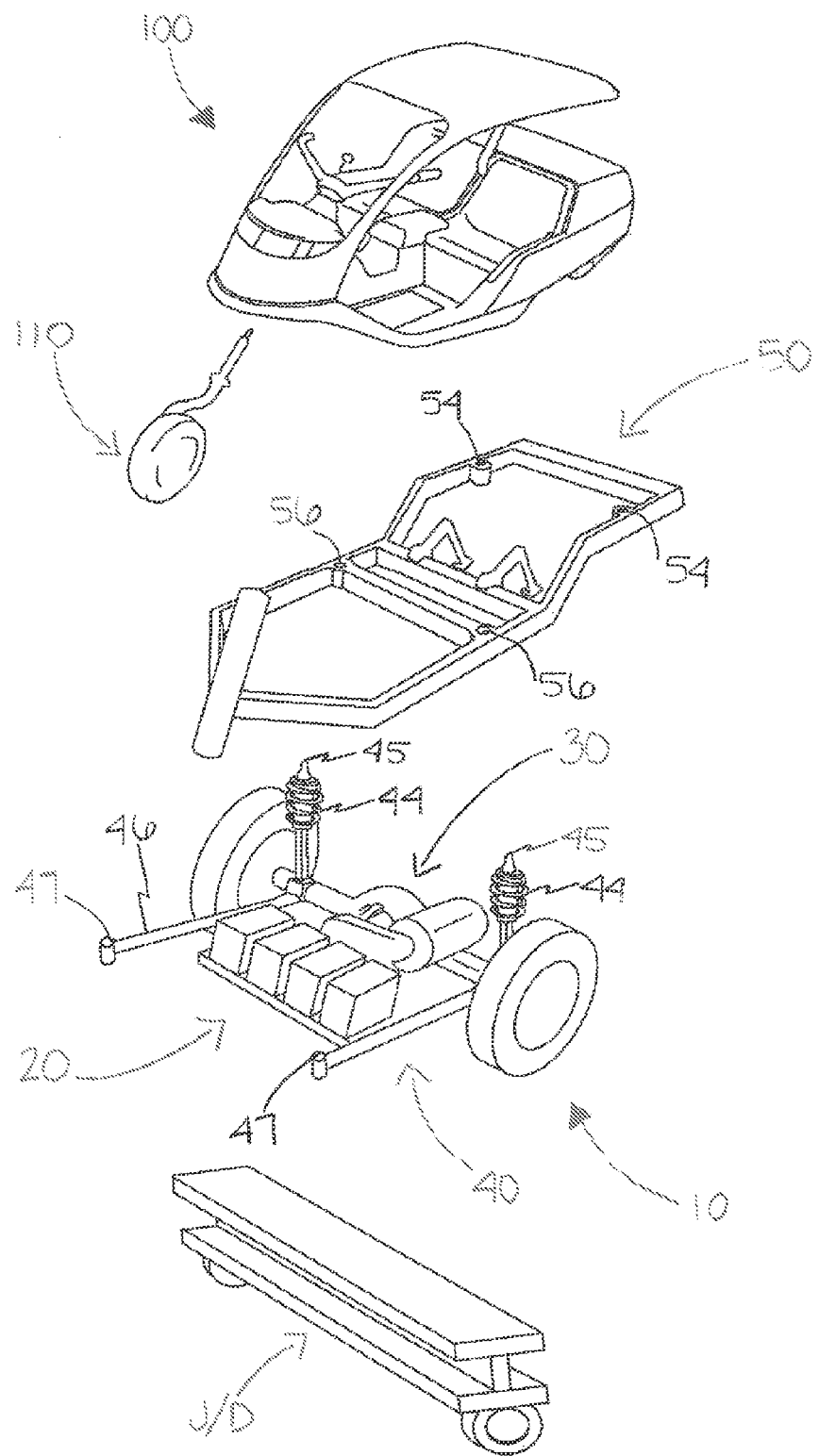
FIG. 1 is an exploded perspective view of one illustrative embodiment of an interchangeable power train system for an electric powered vehicle in accordance with the present invention in combination with a chassis assembly and a body for a 3-wheel electric powered vehicle.
Figure 2:
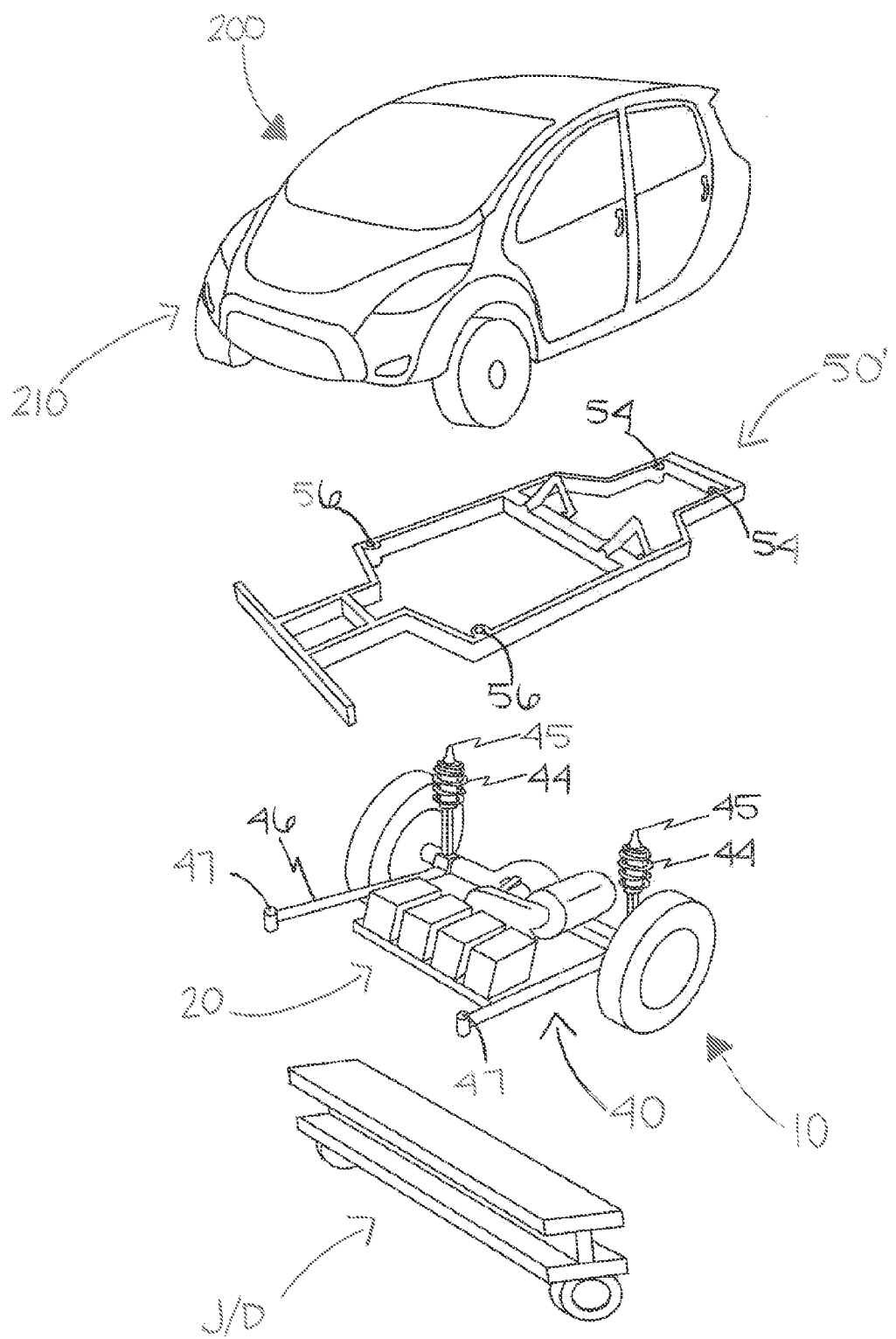
FIG. 2 is an exploded perspective view of one illustrative embodiment of an interchangeable power train system for an electric powered vehicle in accordance with the present invention in combination with a chassis assembly and a body for a 4-wheel electric powered vehicle.

FIGS. 1 and 2 are illustrative of one embodiment of an interchangeable power train system 10 for an electric powered vehicle in accordance with the present invention. As shown in these figures, the system 10 includes a power assembly 20 and a drive assembly 30 which are disposed in operative communication with one another, as explained in greater detail below. Further, the interchangeable power train system 10 for an electric powered vehicle further comprises a support assembly 40, once again, as shown in the illustrative embodiments of FIGS. 1 and 2. The support assembly 40 is configured to securely support a power assembly 20 and a drive assembly 30 mounted thereto in an operative manner. As such, in at least one embodiment, the support assembly 40 comprises a support base 42 to support the aforementioned power assembly 20 and drive assembly 30.

FIGS. 1 and 2 further illustrate a chassis assembly 50, 50', respectively, which are structured to support a corresponding 3-wheel electric powered vehicle body 100, as shown in FIG. 1, or a 4-wheel electric powered vehicle body 200, as shown in FIG. 2, or any of a plurality of other electric powered vehicle body designs cooperatively constructed for operation therewith. FIGS. 1 and 2 further illustrate a chassis assembly 50, 50' including a plurality of interconnects which are utilized to temporarily yet securely interconnect chassis assembly 50, 50' to an interchangeable power train system 10 for an electric powered vehicle in accordance with the present invention. More in particular, chassis assembly 50 comprises suspension interconnects 54 and swing arm interconnects 56, as shown in the illustrative embodiment of FIG. 1. Similarly, chassis assembly 50' also comprises a plurality of suspension interconnects 54 and swing arm interconnects 56, as shown in the illustrative embodiment of FIG. 2. FIGS. 1 and 2 further illustrate that the support assembly 40 of the interchangeable power train system 10 for an electric powered vehicle comprises a plurality of suspension members 44 each having a suspension mount 45 at an upper end thereof. The support assembly 40 in accordance with at least one embodiment of the present invention further comprises a pair of swing arms 46 each having a swing arm mount 47 disposed at a distal end of each, once again, as shown in FIGS. 1 and 2.

It will be appreciated from the illustrative embodiments of FIGS. 1 and 2 that the interchangeable power train system 10 for an electric powered vehicle in accordance with the present invention may be securely yet interchangeably interconnected to either a 3-wheel electric powered vehicle chassis assembly 50, as shown in FIG. 1, or a 4-wheel electric powered vehicle chassis assembly 50', as shown in FIG. 2. More in particular, the suspension mounts 45 and swing arm mounts 47 of each support assembly 40 are configured and arranged so as to align with the corresponding suspension interconnects 54 and swing arm interconnects 56 of either chassis assembly 50 or chassis assembly 50', as is clearly illustrated in FIG. 1 and FIG. 2 respectively. It will be understood by those of skill in the art that snap locks, cotter pins, hitch pins, R-clips, etc., may be utilized to securely yet temporarily interconnect corresponding ones of suspension mounts 45 and suspension interconnects 54, and corresponding ones of swing arm mounts 47 and swing arm interconnects 56.

Stated otherwise, the cooperative configuration and arrangement of the suspension mounts 45 and swing arm mounts 47 on a support assembly 40 of an interchangeable power train system 10 for an electric powered vehicle and the corresponding suspension interconnects 54 and swing arm interconnects 56 of any of a plurality of chassis assemblies 50, 50' for an electric powered vehicle allows the present system 10 to be interchangeably and operatively interconnected to any of a plurality of different electric powered vehicle designs. As will be appreciated from the foregoing, the present invention provides a single standard interchangeable power train system 10 for an electric powered vehicle to be manufactured in a manner that permits it to be operable with a wide variety of electric powered vehicles chassis and body configurations, thereby substantially reducing the cost of manufacturing an entire line of different electric powered vehicles to meet different user needs. As a further result, such electric powered vehicles will be much more accessible financially to a much wider segment of the population requiring the same.

FIGS. 4 and 5 are illustrative of just two examples of the plurality of different electric powered vehicles which may utilize an interchangeable power train system 10 in accordance with the present invention, namely, a 3-wheel electric powered vehicle 1000, as shown in FIG. 4, and a 4-wheel electric powered vehicle 2000, as shown in FIG. 5. Once again, the embodiments of FIGS. 4 and 5 are merely for illustrative purposes and it is understood to be within the scope and intent of the present invention for any of a number of configurations and designs of electric powered vehicles to be operable with an interchangeable power train system 10 in accordance with the present invention.

The power assembly 20 and drive assembly 30 will be described in greater detail with reference to the illustrative embodiments presented in FIGS. 1A and 2A, and with further reference to the schematic presented in FIG. 3. Beginning with the power assembly 20, as may be seen from FIGS. 1A and 2A, the power assembly 20 comprises an electrical energy storage unit 21. In at least one embodiment, an electrical energy storage unit 21 comprises a rechargeable battery or battery pack. As such, a charging interface 22 is provided to allow interconnection of the electrical energy storage unit 21 to an external power supply as needed to recharge the battery or battery pack of the electrical energy storage unit 21. With reference to the schematic presented in FIG. 3, a power assembly 20 in accordance with the present invention further includes a controller 24 which is structured to regulate an electrical output from the electrical energy storage unit 21 to a drive assembly 30. FIG. 3 further illustrates that in at least one embodiment, a power assembly 20 includes an onboard charger 26 so as to minimize or potentially eliminate the need for interconnection to an external power supply in order to maintain sufficient charge in the electrical energy storage unit 21.

Figure 1A:
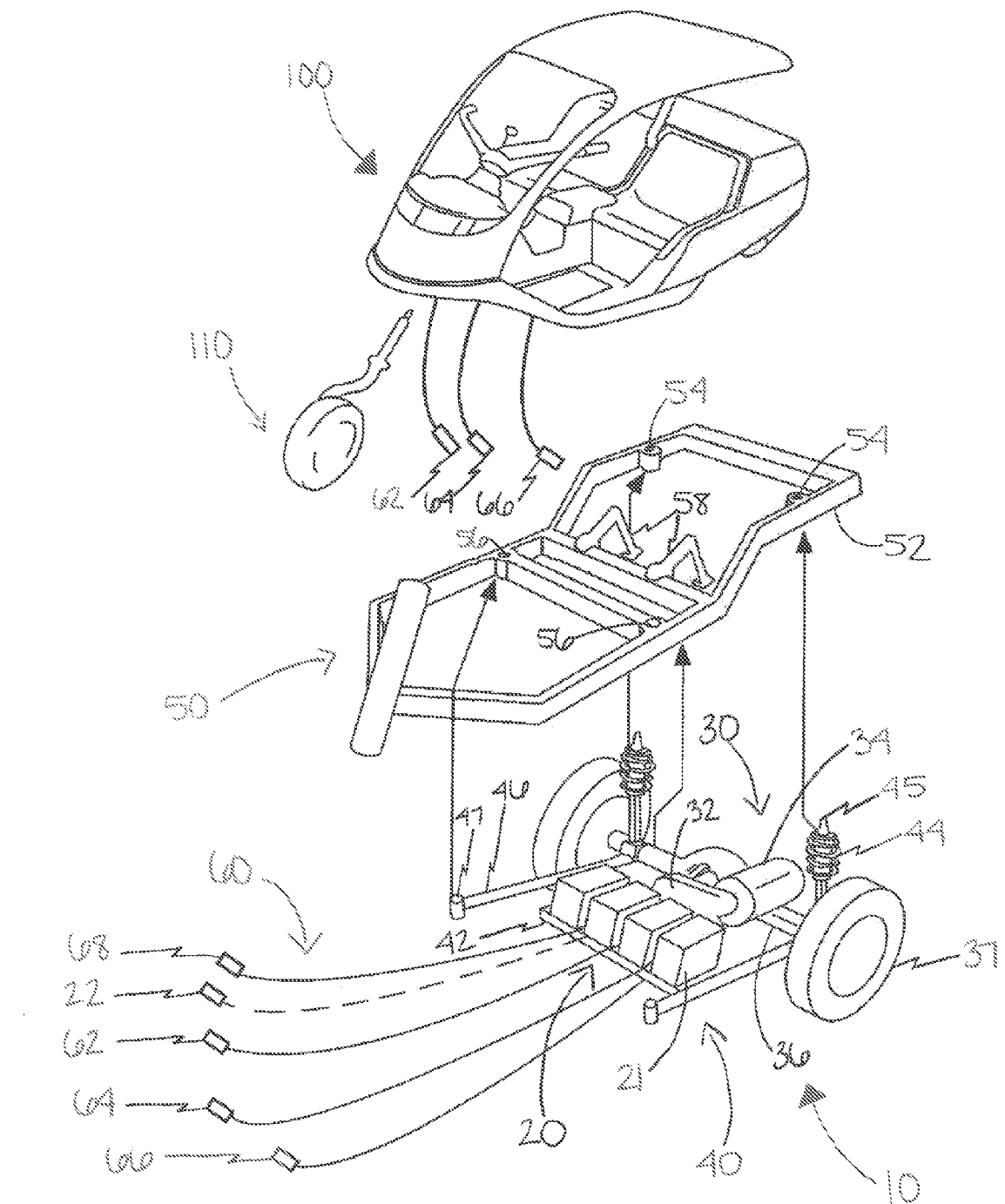
FIG. 1A is a further detailed exploded perspective view of the embodiment of an interchangeable power train system for an electric powered vehicle of FIG. 1.
Figure 2A:
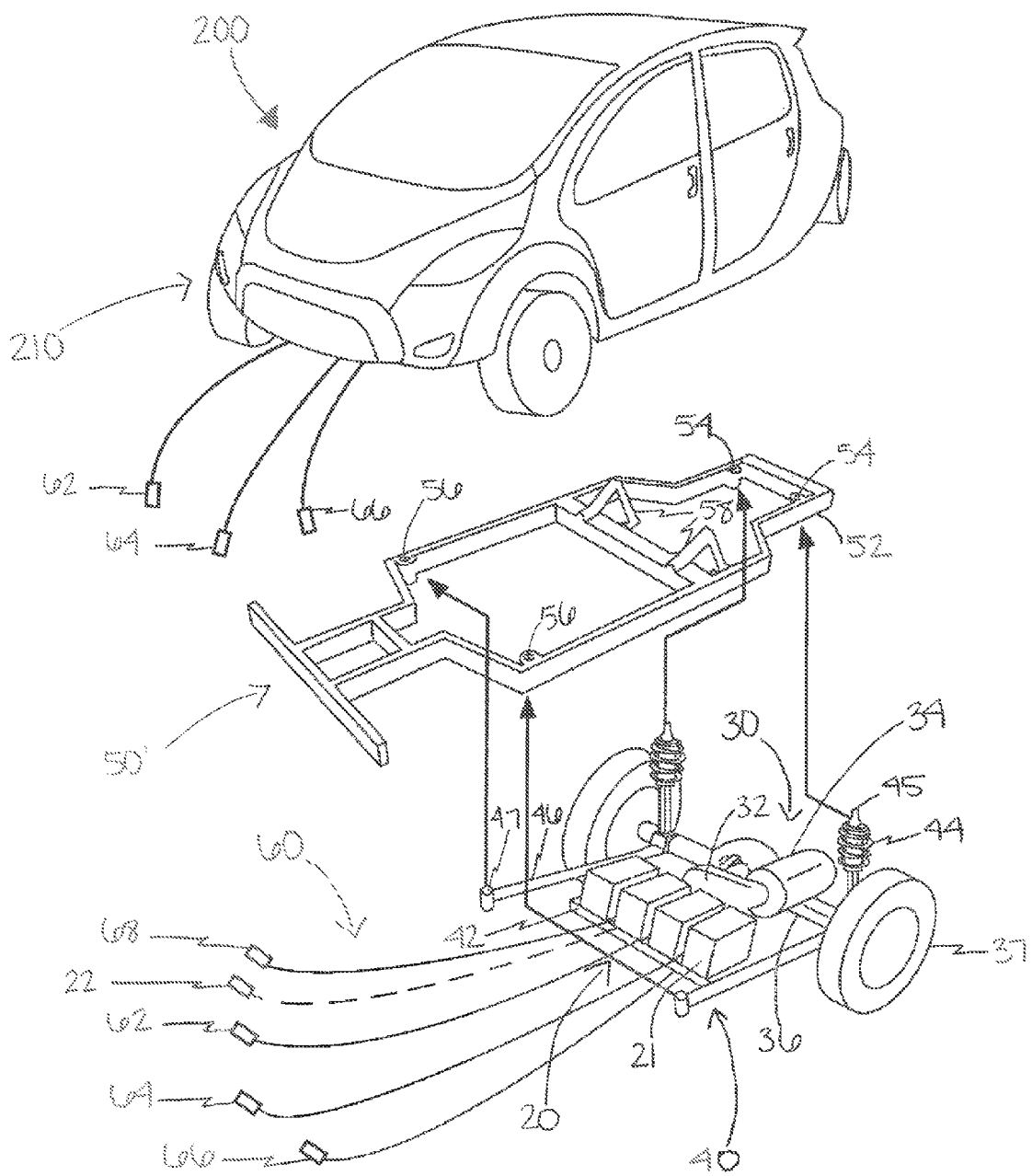
FIG. 2A is a further detailed exploded perspective view of the embodiment of an interchangeable power train system for an electric powered vehicle of FIG. 2.
Figure 3:
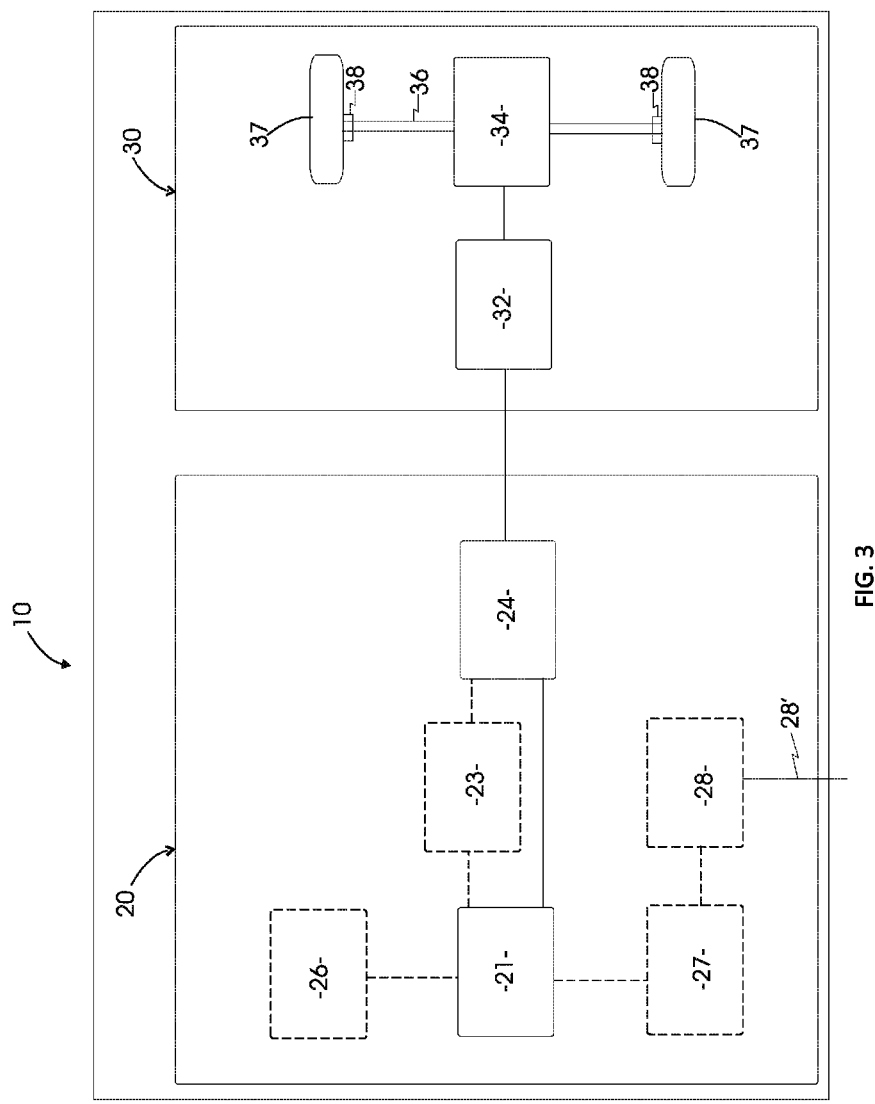
FIG. 3 is a schematic view of one further illustrative embodiment of an interchangeable power train system for an electric powered vehicle in accordance with the present invention.

FIGS. 1A and 2A further illustrate a drive assembly 30 in accordance with the present invention. As shown in these figures, a drive assembly 30 includes an electric motor 34 which is disposed in an operative engagement with a transmission 32. Further, the transmission 32 is disposed in a driving relation to an axle 36 wherein the axle comprises a wheel 37 mounted on opposite ends thereof. Turning once again to the schematic embodiment of FIG. 3, the controller 24 of power assembly 20 is disposed in an electrically communicating relation with the electric motor 34 of the drive assembly 30. In an embodiment employing an alternating current electric motor 34, a power inverter 23 is incorporated into the power assembly 20 in order to convert the direct current output of the electrical energy storage unit 21 to an alternating current as required by an electric motor 34. In at least on embodiment, a line voltage alternating current receptacle is provided downstream of a power inverter 23 to allow a user to operate one or more small alternating current devices within the electric powered vehicle itself.

Looking further to FIG. 3, in at least one embodiment, a power assembly 20 in accordance with the present invention further comprises a fuel cell 27 which is utilized to recharge an electrical energy storage unit 21 via appropriate power and/or control interconnections as would be known by those of skill in the art. The fuel cell 27 may comprise an alkaline fuel cell, a proton exchange membrane or PEM fuel cell, or other types of fuel cells which may be utilized to provide an electrical charge to the electrical energy storage unit 21. In at least one further embodiment, an accompanying fuel storage unit 28 is provided to supply fuel cell 27, wherein the fuel may comprise compressed hydrogen or a hydrogen containing compound including a decomposition catalyst, such as, by way of example, a light hydrocarbon fuel with a reformer, or ammonia with a cracker, etc. In an embodiment comprising a fuel storage unit 28, an appropriate refill connection 28' may also be provided.

FIG. 3 further presents a schematic of a drive assembly 30 in accordance with at least one embodiment of the present invention. As stated above, a drive assembly 30 comprises an electric motor 34 which operatively engages a transmission 32 which is disposed in driving relation to axle 36. As shown in FIG. 3, a wheel 37 is mounted on opposite ends of axle 36. Looking further to the illustrative embodiment of FIG. 3, the drive assembly 30 includes at least one brake unit 38 structured to engage axle 36 and/or wheel 37 in order to decelerate and stop an electric powered vehicle in which the interchangeable power train system 10 of the present invention is operatively interconnected. In at least one embodiment, the drive assembly 30 comprises a brake unit 38 corresponding to each wheel 37 of the drive assembly 30, as shown in FIG. 3.

Looking once again to the illustrative embodiments of FIGS. 1A and 2A, an interchangeable power train system 10 in accordance with the present invention further comprises an interface assembly 60. More in particular, interface assembly 60 comprises a plurality of interfaces between the interchangeable power train system 10 and an electric powered vehicle itself. In at least one embodiment, each of the plurality of interfaces between the interchangeable power train system 10 and an electric powered vehicle 1000, 2000 comprise quick connect type interconnections so as to facilitate the interchangeable interconnection of a 3-wheel electric powered vehicle 1000 or a 4-wheel electric powered vehicle 2000 to and from the system 10 of the present invention. As shown in FIGS. 1 and 2, a jack or dolly (J/D), is provided to facilitate the interchangeable interconnection of an electric powered vehicle body 100, 200 to and from the interchangeable power train system 10. Looking further to FIGS. 1A and 2A, an interface assembly 60 comprises an electrical interface 62 having a portion associated with the interchangeable power train system 10 and another portion associated with an electric powered vehicle, such as, 3-wheel electric powered vehicle body 100 or a 4-wheel electric powered vehicle body 200, respectively. Electrical interface 62 is utilized to allow activation and deactivation of electric motor 34 of the drive assembly 30. In at least one embodiment, an electrical interface 62 comprises a low voltage electrical connection that allows for diagnostics, such as, speed, electrical energy storage unit capacity, charging status, and other such diagnostic data which may be useful to an operator of an electric powered vehicle.

An interface assembly 60 in accordance with the present system 10 further comprises an accelerator interface 64. Once again and similar to electrical interface 62, a portion of accelerator interface 64 is associated with the interchangeable power train system 10 and another portion is associated with electric powered vehicle body 100, 200, as shown in FIGS. 1A and 2A, respectively. As the name implies, the accelerator interface 64 communicates between an accelerator switch or pedal located within reach of an operator of an electric powered vehicle 1000, 2000, and the electric motor 34 and transmission 32 of drive assembly 30, such that the operator of the vehicle can accelerate and decelerate the electric powered vehicle 1000, 2000. An interface assembly 60 in at least one further embodiment also comprises a braking interface 66. As before, a portion of the braking interface 66 is disposed in communication with interchangeable power train system 10 and another portion is associated with electric powered vehicle body 100, 200. As with accelerator interface 64, the braking interface 66 allows an operator of a vehicle to decelerate an electric powered vehicle 1000, 2000 as needed by actuation of a brake pedal or brake switch which is disposed in the electric powered vehicle body 100, 200 within convenient reach of an operator of a vehicle.

In at least one further embodiment, an interface assembly 60 also comprises an auxiliary data interface 68 such as is shown in the illustrative embodiments of FIGS. 1A and 2A. In one embodiment, an auxiliary data interface 68 is provided for interconnection to controller 24 and/or optional fuel cell 27 and/or fuel storage 28 in order to provide external diagnostics, software upgrades, fuel levels, fuel storage parameters, etc., as may be required and/or desired for operation and/or maintenance of an electric powered vehicle utilizing an interchangeable power train system 10 in accordance with the present invention.

Now that an interchangeable power train system 10 for an electric powered vehicle in accordance with the present invention has been fully described and disclosed, the following is a description of the process for the quick and easy interchange between a 3-wheel electric powered vehicle body 100 and chassis assembly 50, and a 4-wheel electric powered vehicle body 200 and chassis assembly 50'. As will be appreciated from the figures and foregoing disclosure, the rear of an interchangeable power train system 10 in accordance with the present invention is supported by an axle 36 and rear wheels 37. Thus, when interchanging between a 3-wheel electric powered vehicle body 100 and 4-wheel electric powered vehicle body 200 and associated chassis assemblies 50, 50', a jack or dolly (J/D) is positioned on a solid surface under swing arms 46 of the support assembly 40 to provide support for the front of the system 10, while the 3-wheel electric powered vehicle body 100 or 4-wheeled electric powered vehicle body 200, and corresponding chassis assembly 50, 50', is disconnected from the interchangeable power train system 10. In at least one embodiment, one or more pivot supports 58, such as is shown in the illustrative embodiment of FIGS. 1A and 2A, are pivoted downward so that the lower ends rest on the ground until the interchangeable power train system 10 is moved into or out of position with respect to a corresponding chassis assembly 50, 50'. In at least one embodiment, pivot support 58 comprise integral electrically operated or hydraulically operated jacks, similar to those used on small cargo trailers.

Since many modifications, variations and changes in detail can be made to the described illustrative embodiments of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An interchangeable power train system operative independently with each of a plurality of different electric powered vehicles, said system comprising:
   a power assembly and a drive assembly disposed in an operative communication with one another,
   a support assembly having said power assembly and said drive assembly mounted thereto,
   a chassis assembly having a chassis supporting at least one of a plurality of different electric powered vehicle bodies,
   said support assembly comprising at least one suspension mount and said chassis assembly comprising at least one suspension interconnect dimensioned and disposed to temporarily yet securely interconnect to said at least one suspension mount of said support assembly,
   said support assembly further comprising at least one swing arm, said at least one swing arm having a swing arm mount attached to an end thereof,
   said chassis assembly further comprising at least one swing arm interconnect which temporarily yet securely interconnects to said at least one swing arm mount of said support assembly, and
   an interface assembly operatively connecting said power assembly and said drive assembly to each of the plurality of different electric powered vehicles one at a time.

2. The system as recited in claim 1 wherein said power assembly comprises an electrical energy storage unit.

3. The system as recited in claim 1 wherein said power assembly comprises a charging interface interconnecting said electrical energy storage unit to an external electrical charging device.

4. The system as recited in claim 2 wherein said power assembly comprises a controller to regulate an electrical output from said electrical energy storage unit.

5. The system as recited in claim 1 wherein said drive train assembly further comprises an axle having a pair of oppositely disposed wheels attached thereto.

6. The system as recited in claim 5 wherein said drive assembly comprises a transmission disposed in a driving relation to said axle.

7. The system as recited in claim 6 wherein said drive assembly comprises an electric motor disposed in an operative engagement with said transmission.

8. The system as recited in claim 7 wherein said drive assembly comprises at least one brake unit.

9. The system as recited in claim 1 wherein said interface assembly comprises at least one interface selected from the group consisting of an electrical interface, an accelerator interface, and a braking interface.

10. An interchangeable power train system operative independently with each of a 3-wheel electric powered vehicle or a 4-wheel electric powered vehicle, said system comprising:
    a power assembly and a rear-wheel drive assembly disposed in an operative communication with one another,
    a support assembly having said power assembly and said drive assembly mounted thereto,
    a chassis assembly supporting at least one of a 3-wheel electric powered vehicle body or a 4-wheel electric powered vehicle body,
    said support assembly comprising at least one suspension mount formed on a rear portion of said support assembly, and said chassis assembly comprising at least one suspension interconnect dimensioned and disposed to temporarily yet securely interconnect to said at least one suspension mount of said support assembly,
    said support assembly further comprising at least one swing arm,
    said at least one swing arm having a swing arm mount attached to an end thereof which extends towards a midsection of the 3-wheel electric powered vehicle body or the 4-wheel electric powered vehicle body,
    said chassis assembly further comprising at least one swing arm interconnect dimensioned and disposed to temporarily yet securely interconnect to said at least one swing arm mount of said support assembly, and
    an interface assembly operatively connecting said power assembly and said drive assembly to either the 3-wheel electric powered vehicle or the 4-wheel electric powered vehicle.

11. The system as recited in claim 10 wherein said chassis assembly comprises a 3-wheel vehicle chassis assembly.

12. The system as recited in claim 10 wherein said chassis assembly comprises a 4-wheel vehicle chassis assembly.

13. The system as recited in claim 10 wherein said power assembly comprises an electrical energy storage unit and a charging interface interconnecting said electrical energy storage unit to an external electrical charging device.

14. The system as recited in claim 13 wherein said power assembly comprises a controller to regulate an electrical output from said electrical energy storage unit.

15. The system as recited in claim 14 wherein said drive train assembly further comprises an axle having a pair of oppositely disposed wheels attached thereto.

16. The system as recited in claim 15 wherein said drive assembly comprises a transmission disposed in a driving relation to said axle.

17. The system as recited in claim 16 wherein said drive assembly comprises an electric motor disposed in an operative engagement with said transmission.

18. The system as recited in claim 17 wherein said drive assembly comprises at least one brake unit.

19. The system as recited in claim 18 wherein said interface assembly comprises at least one interface selected from the group consisting of an electrical interface, an accelerator interface, and a braking interface to facilitate operation of the 3-wheel electric powered vehicle or the 4-wheel electric powered vehicle.

20. The system as recited in claim 18 wherein said interface assembly comprises an electrical interface, an accelerator interface, and a braking interface to facilitate operation of the 3-wheel electric powered vehicle or the 4-wheel electric powered vehicle.

\* \* \* \* \*